United States Patent [19]

Sakamoto et al.

[11] Patent Number: 5,592,240
[45] Date of Patent: Jan. 7, 1997

[54] DIGITAL CONVERGENCE APPARATUS

[75] Inventors: Tsutomu Sakamoto; Masanori Fujiwara; Yoshiji Tsuzuki; Hisayuki Mihara, all of Saitama-ken, Japan

[73] Assignee: Kabushiki Kaisha Roshiba, Kawasaki, Japan

[21] Appl. No.: 493,749

[22] Filed: Jun. 22, 1995

[30] Foreign Application Priority Data

Jun. 22, 1994 [JP] Japan .................................. 6-140504

[51] Int. Cl.$^6$ .............................. H04N 3/22; H04N 9/28
[52] U.S. Cl. ............... 348/807; 315/368.11; 315/368.12; 348/806
[58] Field of Search ..................... 348/806, 807, 348/745; 315/368.11, 368.12, 368.13, 368.24; H04N 3/22, 3/26, 9/28

[56] References Cited

U.S. PATENT DOCUMENTS

| 4,672,275 | 6/1987 | Ando .................................... 348/745 |
| 5,398,083 | 3/1995 | Tsujihara et al. ...................... 348/807 |

FOREIGN PATENT DOCUMENTS

| 63-43485 | 2/1988 | Japan . |
| 3291089 | 12/1991 | Japan . |
| 4207384 | 7/1992 | Japan ............................... H04N 9/28 |

*Primary Examiner*—Micheal H. Lee
*Attorney, Agent, or Firm*—Cushman, Darby & Cushman; IP Group of Pillsbury; Madison & Sutro LLP

[57] ABSTRACT

A digital convergence apparatus using two different kinds of data to correct the convergence of odd and even scanning lines, respectively. A first memory stores data for the convergence correction corresponding to plural correction executing points aligned in the horizontal or vertical direction of a screen. A first static convergence data memory stores a first static convergence correction data for correcting the entire screen in the same direction, a second static convergence data memory stores a second static convergence correction data different from the first static convergence correction data only by an amount corresponding to the distance between the scanning lines. Selecting means select the output of the first or the second static convergence data memory according to the odd field period or the even field period. Adding means add the output of the selecting means to the data stored in the first memory. Vertical interpolating means interpolate the output of the adding means in the vertical direction, and a convergence correction coil corrects the convergence based on the output of the adding means.

16 Claims, 12 Drawing Sheets

| D00 | D10 | D20 | D30 | D40 | D50 | D60 |
| D01 | D11 | D21 | D31 | D41 | D51 | D61 |
| D02 | D12 | D22 | D32 | D42 | D52 | D62 |
| D03 | D13 | D23 | D33 | D43 | D53 | D63 |
| D04 | D14 | D24 | D34 | D44 | D54 | D64 |

| D00 | D10 | D20 | D30 | D40 | D50 | D60 |
| d01 | d11 | d21 | d31 | d41 | d51 | d61 |
| d02 | d12 | d22 | d32 | d42 | d52 | d62 |
| d03 | d13 | d23 | d33 | d43 | d53 | d63 |
| d04 | d14 | d24 | d34 | d44 | d54 | d64 |

DIGITAL CONVERGENCE APPARATUS

FIELD OF THE INVENTION

The present invention relates to a digital convergence apparatus which is used in color television receivers, and R, G and B three-tube type projection television receivers.

BACKGROUND OF THE INVENTION

The ever-increasing demand for large-size color television receivers has led to the development of large-sized direct viewing CRT-type color television receivers larger than 30". However, because CRTs that are larger than 30" increase in weight drastically, the 30" type CRT is considered to be the largest size available for practical use.

On the other hand, because the projection type color television receivers project a picture from projection tubes (CRT) through a lens system for magnification, they can be designed relatively compact in size and relatively light in weight. The projection type television receivers have therefore become the mainstream in color television receivers that exceed 40".

The projection type color television receiver has monochrome projection picture tubes of R (red), G (green) and B (blue). The video signals in R (red), G (green) and B (blue) are supplied to respective projection tubes which are linearly aligned. R, G and B images on respective projection tubes are magnified, projected and imaged on a screen through an optical system comprising lenses, reflectors, etc. However, some color deviations are induced in the projected image on the screen due to the different angles of incidence of beams emitted from respective projection tubes onto the screen, an alignment deviation of the three monochrome projection tubes, unmatching of orbits of the electron beams due to the earth magnetism, etc. To overcome the improper convergence, a convergence correction apparatus is provided to focus R, G and B image electron beams on the screen. The convergence correction apparatus corrects the deviation angles of the electron beams by applying the correction field through the convergence correction coil provided to the projection tube of each axis.

FIG. 8 is an explanatory diagram showing one example of such conventional projection type television receiver, while FIG. 9 is an explanatory diagram showing the arrangement of R, G and B projection tubes in such conventional projection type television receiver.

In FIG. 8 a screen 2 is provided on the upper front side in a cabinet 1. A chassis (not shown) is installed on the floor of the cabinet 1, and an image receiving circuit (not shown), etc. is mounted on the chassis. Supporting members (not shown) are mounted within the cabinet 1, so as that the R, G and B projection tubes 3R, 3G and 3B are supported on these supporting members when installed in the cabinet 1. R, G and B image electron beams are emitted from the R, G and B projection tubes 3R, 3G and 3B in response to the image signals provided from the image receiving circuit. The image electron beams emitted from the projection tubes 3R, 3G and 3B are reflected by a reflection mirror 4 mounted on the front surface of the cabinet 1 and a reflection mirror 5 mounted on the rear surface through projection lens 6R, 6G and 6B, respectively, before being projected on the screen 2.

FIG. 9 shows the orientations of the projection tubes 3R, 3G and 3B viewed from the top of the cabinet 1. The R, G and B projection tubes 3R, 3G and 3B are aligned in a horizontal line parallel to the screen 2, as shown in FIG. 9. Further, the projection tubes 3R, 3G and 3B are so arranged that their optical axes join to each other in consideration of the structure of the optical system. The R, G and B image electron beams from the projection tubes 3R, 3G and 3B are emitted through respective projection lenses 6R, 6G and 6B to form images on the screen 2. A magnified color image is thus displayed on the screen.

A display unit employing a digital convergence apparatus is higher in cost than analog type convergence apparatus. It is easy to correct and has higher correction accuracy. Also, use of the digital convergence apparatus is increasing in these years. FIG. 10 is a block diagram showing a color television receiver with such a conventional digital convergence apparatus. In FIG. 10, only the R image section is shown. Other G and B image sections have a similar structure to the R image section.

The apparatus as shown in FIG. 10 forms an image of a convergence correction pattern on a screen, corrects the color deviation of each part shown on the screen by correcting the convergence, stores the correction data of each part for one field in a memory, generates a correction signal from the correction data read out in synchronization with the scanning of the screen and provides the correction signal as the correction current to the convergence correction coil.

A grid pattern, generally called as a crosshatch pattern, is often used for the correction of convergence. In a manufacturing process, an operator carries out convergence correction by manipulating an adjusting tool while observing the convergence correction grid pattern on the screen. Normally, all intersecting points of the vertical and horizontal lines of the convergence correction pattern define the correction executing points where the convergence corrections can be made. The operator selects any one or plural correction executing points and then carries out the correction so as to reduce the color deviation at the correction executing points using the adjusting tool.

FIGS. 11(a) through 11(c) are explanatory diagrams showing the crosshatch patterns displayed on the screen by the R, G and B projection tubes before the convergence correction is performed. FIGS. 11(a) through 11(c) show patterns displayed on the screen by the projection tubes 3R, 3G and 3B of respective axes. Such distortions of the crosshatch patterns are induced due to the optical system characteristic attributable mainly to the lenses, as shown in FIGS. 11(a) through 11(c). Thus, correction currents consistent with the distortions are supplied to convergence correction coils to reduce the color deviations.

In FIG. 10, the high frequency television signal (RF signal) induced on an antenna 11 is received by a tuner 12, which selects a prescribed channel under the control of a channel selector 13. The tuner 12 converts the RF signal into the intermediate frequency signal (IF signal), and then supplies the IF signal to a detector/amplifier unit 14. After detected and amplified by the detector/amplifier unit 14, the IF signal is provided to a signal processor IC 15.

The signal processor IC 15 converts the input baseband video signals into R, G and B signals by executing a video signal processing, a chromatic processing and a synchronizing deflection processing to the baseband video signal. The R signal is supplied to a projection tube driver 16. The signal processor IC 15 gives the horizontal pulse H separated from video signals to a horizontal driver 17 and a high voltage driver 18, and gives the vertical pulse V to a vertical output unit 19.

A deflection driver 20 is comprised of the horizontal driver 17, a horizontal output unit 21, a horizontal output transformer 22 and the vertical output unit 19. The horizontal driver 17 gives the horizontal driving pulse of the horizontal period to the horizontal output unit 21, which generates the sawtooth wave current of the horizontal period and gives it to a horizontal deflection coil 23. This sawtooth wave current is also provided to an intermediate voltage and a low voltage power units (not shown) via the horizontal output transformer 22. Further, the horizontal driving pulse HD of the horizontal period is also provided to a convergence corrector 25 from the horizontal output transformer 22. On the other hand, the vertical output unit 19 generates the sawtooth wave current of the vertical period from the vertical pulses and provides the current to a vertical deflection coil 24. The vertical output unit 19 also generates the vertical driving pulse VD of the vertical period and provides the pulse VD to the convergence corrector 25.

The convergence corrector 25 is equipped with a memory having the capacity of one field, in which convergence correction data for generating the convergence correction currents are stored. The convergence corrector 25, when provided with the horizontal and vertical driving pulses HD and VD, reads data out of the memory in synchronization with the scanning of the screen and generates the correction current based on the read data. This correction current is provided to a convergence correction coil 32 via a driving amplifier 31 to correct the distortion on the screen. Further, two convergence correction coils for the horizontal deflection and the vertical deflection are provided for each of the three of the R, G and B sections, a driving amplifier 31 being provided for each of the convergence correction coils. Accordingly, total six driving amplifiers are provided.

The projection tube driver 16 drives a projection tube 29 according to the R-signal. The horizontal and vertical deflections of the projection tube 29 are controlled by the horizontal and vertical deflection coils 23 and 24 and the convergence correction coil 32. Thus an image associated with the R-signal is emitted from the projection tube 29. The high voltage bias for the projection tube 29 is generated by a high voltage generator 28, which is comprised of the high voltage driver 18, a high voltage output unit 26 and a flyback transformer 27. The high voltage driver 18 provides the pulse with the horizontal period to the high voltage output unit 26, which provides the current with the horizontal period to the flyback transformer 27 to generate the high voltage bias output from the flyback transformer 27 during the horizontal retrace line period. This high voltage bias output is provided to an anode 30 of the projection tube 29.

The high voltage bias output from the high voltage generator 28 is detected by a resistance type voltage divider composing of resistors R1 and R2. The voltage on the connecting point of the resistors R1 and R2 is input to a comparator 35, where a high voltage fluctuation component is detected by comparing the input voltage with the reference voltage. The high voltage fluctuation component is supplied to a high voltage controller 33. The high voltage controller 33 comprises a control transistor and a saturable reactor (not shown). It operates to make the high voltage fluctuating component zero by controlling the primary winding voltage of the flyback component. A high voltage stabilizer 34 is composed by the divider including the resistors R1 and R2, the comparator 35 and the high voltage controller 33.

FIG. 12 is a block diagram showing the definite construction of the convergence corrector 25 shown in FIG. 10.

Correction data of the correction executing points on the crosshatch pattern are obtained and stored in a data storage 41 in the manufacturing process of the projection type projector, etc. before shipping. When the power source of the projection type projector, etc. are turned on, a control microcomputer 42 controls a data transfer controller 43 to transfer the correction data of the correction executing points stored in the data storage 41 to a field memory 44. A selector 45 is controlled by the data transfer controller 43 to select either one of the write address from the data transfer controller 43 or the read address from a read address generator 46, and to provide the selected address to the field memory 44. In transferring the data, the write address from the data transfer controller 43 is selected by the selector 45.

When the transferring of the correction data to the field memory 44 is completed, the data transfer controller 43 provides the read address from the read address generator 46 to the field memory 44 by controlling the selector 45. The read address generator 46, to which the horizontal and vertical synchronizing signals are input, match the correction data which is output from the field memory 44 to a position on a screen by generating the read address in synchronization with the horizontal and vertical scannings. The correction data are provided to an adder 47 when output, in order, from the field memory 44.

Although deviations of static convergence induced due to the assembling tolerance of an electron gun, etc. can be corrected using the correction data, the deviation of the static convergence may be induced due to the earth magnetism due to the installing direction, secular change, etc. Because these factors are often unpredictable during the manufacturing process, the correction data stored in data storage 41 does not account for or correct these deviations. Hence, the convergence deviation may not be certainly corrected using the correction data stored in the data storage 41. So, a static convergence correction data which is adjustable by an operator is added to the correction data to correct this static convergence deviation.

A static convergence correction data output unit 48 maintains static convergence correction data. The static convergence correction data is a data showing the amount of movement in the horizontal and vertical directions and is set for each of R, G and B colors. That is, the static convergence correction data is comprised of 6 kinds of data, each of which is comprised of one word. Therefore, the static convergence correction data output unit 48 is provided with a memory having the capacity to store 6 words for the adjusting colors R, G and B in the horizontal and vertical directions. The static convergence correction data output unit 48 outputs the static convergence correction data to the adder 47 corresponding to the correction data provided from the field memory 44.

Further, as described above, it is possible to modify the static convergence data by an operator. The control microcomputer 42 is capable of modifying the static convergence data by giving data to the static convergence correction data output unit 48 using an entry unit 49 such as a remote controller. The adder 47 outputs the correction data from the field memory 44 to a vertical interpolator 50 with the static convergence correction data added.

The correction executing points properly assigned on scattered locations on a screen to reduce the capacity of the field memory 44 and a correction data between the correction executing points is obtained by the interpolation. That is, the vertical interpolator 50 obtains a correction data between the correction executing points in the vertical direction by interpolating the correction data in the vertical direction. As a result, a correction data corresponding to each scanning line is output from the vertical interpolator 50. A D/A converter 51 converts the correction data from the vertical interpolator 50 into analog signals, and a low-pass filter (hereinafter referred to as LPF) 52 smooths the correction data in the horizontal direction by removing the harmonic component and provides to the convergence correction coil 32.

In the normal video display, a selector 55 provides video signals to a display 57 under the control of the control microcomputer 42, and the convergence correction coil 32 displays an image on the screen (not shown) without the color deviation by deflecting beam current corresponding to the correction voltage. Two kinds of convergence correction coils 32 are respectively provided for the horizontal and vertical directions. The correction signal provided to the horizontal convergence correction coil displaces electron beams to the left at the positive polarity and to the right at the negative polarity. The correction signal provided to the vertical convergence correction coil displaces electron beams in the downward direction at the positive polarity and in the upward direction at the negative polarity.

In the following, the convergence correction will be described in detail.

A pattern generator 56 is provided with the output of the read address generator 46. Using this output, pattern generator 56 generates a pattern signal for displaying a convergence correction pattern such as a crosshatch pattern and outputs it to the selector 55. When an operator manipulates the entry unit 49 to direct the start of the convergence correction, the control microcomputer 42 controls the selector 55 to select the output of the pattern generator 56. Thus, a pattern signal is provided to a display 57 and a convergence correction pattern is displayed on the screen (not shown).

The operator makes the correction to reduce color deviations at the correction executing points by manipulating the entry unit 49 while observing the correction pattern displayed on the screen. The information on this correction is supplied to the field memory 44 and the data storage 41 as the correction data via the control microcomputer 42. The field memory 44 stores the correction data at all the selected correction executing points displayed on the screen and outputs the correction data in synchronization with the screen scanning under the control of the data transfer controller 43. Likewise, the normal video display operation, the correction data read out of the field memory 44 is supplied to the convergence correction coil 32 via the vertical interpolator 50, the D/A converter 51, the LPF 52 and the amplifier 53. Thus, the color deviation at each part of the screen is adjusted.

The operator makes the correction at each correction executing point using the entry unit 49 so that the color deviation is minimized. As a result of the correction, the correction data stored in the field memory 44 and the data storage 41 are updated in order and the adjusted correction data for each correction executing point is stored in the data storage 41. Thus, in the normal video display operation, it becomes possible to display video on the screen at a satisfactory convergence by reading the correction data stored in the data storage 41.

FIG. 13 is a block diagram showing a definite construction of the vertical interpolator 50 shown in FIG. 12. The circuit shown in FIG. 13 is disclosed in the Japanese Patent Application, Tokkai-Sho No. 58-01586.

In the circuit shown in FIG. 13, it is assumed that the correction data at the correction executing points and the difference between the correction data at the correction executing points are stored in the field memory 44. FIG. 14 is an explanatory diagram showing the screen display when a crosshatch pattern from the pattern generator 56 is supplied to the display 57. The intersecting points of the crosshatch pattern are the correction executing points. FIG. 14 indicates that 5 vertical points and 7 horizontal points, a total 35 correction executing points, are assigned. Correction data for 35 correction executing points are stored in the field memory 44.

Now it is assumed that correction data to correct the convergence at the correction executing points are D00 through D60, D01 through D61, . . . D04 through D64 as shown in FIG. 15. The correction data D00 through D60 on the first line (hereinafter referred to as the first adjusting line) of the crosshatch are stored in the corresponding locations in the field memory 44. As to the second line of the crosshatch (hereinafter referred to as the second adjusting line) and subsequent lines, the difference between the correction data of the Lth line of the crosshatch (hereinafter referred to as the Lth adjusting line) and the correction data of the (L-1)th adjusting line is obtained for each line. The obtained differential data is stored in the corresponding location in the field memory 44. For instance, the differential data d02 through d62 between the correction data D02 through D62 of the third adjusting line and the correction data D01 through D61 of the second adjusting line are stored in the field memory 44 as the correction data of the third adjusting line. Thus, the data shown in FIG. 16 are stored in the field memory 44.

With reference to FIG. 13, the read address generator 46 is comprised of a Y address counter 61, an X address counter and a frequency divider 63. The frequency divider 63 starts the 2/n frequency division after being cleared by a vertical sync signal. The first horizontal sync signal is then input after the vertical sync signal is input. That is, the frequency divider 63 counts a horizontal sync signal subsequent to the second horizontal sync signal after the vertical sync signal is input, and carries out the 2/n frequency division by outputting one clock at every n/2 counting, "n" representing the number of scanning lines between the correction executing points in the vertical direction.

The output of the frequency divider 63 is supplied to the Y address counter 61. The Y address counter 61 is cleared by a vertical sync signal. After being cleared, Y address counter 61 counts the output of the frequency divider 63 and outputs the count to the field memory 44 via the selector 45. For instance, if the number of valid scanning lines of a video signal in the frame is 480 lines and 5 adjusting lines are assigned per one frame, "n" is 80 lines in the frame. As data for one field is stored in the field memory 44, data corresponding to the scanning of the screen can be read out when Y address is updated for every n/2 scanning line (40 scanning lines).

The X address counter 62 is cleared by a horizontal sync signal. After being cleared, X address counter 62 counts a clock CLK and outputs the count to the field memory 44 as an X address via the selector 45. The clock CLK represents a clock having pulses of m pieces of the correction executing points in the horizontal direction in one horizontal scanning period (e.g., m=7 in FIG. 14).

The adder 47 adds a static convergence correction data from the static convergence correction data output unit 48 to the data read out of the field memory 44 and outputs the added data to a vertical interpolator 50. The adder 47 adds a static convergence correction data S only when the correction data of the correction executing point of the first adjusting line is read out of the field memory 44.

The vertical interpolator 50 is comprised of a divider 65, an adder 66, a register 67 and a latch 68. The divider 65 divides the output of the adder 47 by 2/n or 1/1, and outputs the result of the division to the adder 66. The divisor n/2 of the divider 65 is consistent with the frequency division ratio of the frequency divider 63. The adder 66 adds the output of the latch 68, which will be described later, to the output of the divider 65 and outputs the result to the register 67. The register 67 is provided with X address; it stores m pieces of data from the adder 66 and outputs them to the latch 68. Further, at the time when the vertical scanning period started, all the data retained in the register 67 represent zero (0). The output of the adder 66 is delayed by one horizontal scanning period through the register 67 and applied to the latch 68. The latch 68 latches the output of the register 67 by the clock CLK and outputs it to the adder 66 and the D/A converter 51.

According to this construction, the count output of the Y address counter 61 indicates zero (0). That is, at the timing at the uppermost part of the frame, the Y address counter 61 outputs Y address 0 for reading the correction data of the first adjusting line of the field memory 44. On the other hand, the X address counter 62 counts m pieces of clock CLK generated in one horizontal scanning period and outputs it as the X address. That is, the correction data D00 of the first correction executing point of the first adjusting line of the field memory 44 is read out by the input of the clock CLK immediately after the horizontal sync signal.

The read correction data D00 is supplied to the divider 65 after being added with a static convergence correction data S in the adder 47. At this time, the divisor of the divider 65 is 1 and the correction data D00+S is supplied to the adder 66 as it is. Further, at this time, the correction data D00+S that is input to the adder 66 is stored in the register 67 to replace the zeros previously stored there. Thereafter, the X address increases as the clock CLK is input, the correction data D10 through D60 of the field memory 44 are read out in order and stored in the register 67 after being added with the static convergence correction data S.

In the next horizontal scanning period, the frequency divider 63 starts the 2/n frequency division of the horizontal sync signal. The output of the Y address counter 61 becomes 1 and the differential data d01 through d61 of the correction executing points of the second adjusting line of the field memory 44 are read out in order every time when the clock CLK is input. The differential data d01 through d61 are supplied to the divider 65 without the static convergence correction data S added. The divisor of the divider 65 at this time is n/2 and the differential data d01 through d61 are multiplied by 2/n and output to the adder 66.

The data stored in the register 67 for the preceding horizontal scanning period is output via the latch 68 in this horizontal scanning period. The adder 66 adds the differential data 2×d01/n from the divider 65 to the correction data stored in the register 67 and stores the added result in the register 67. Similarly, the adder 66 adds the differential data (2×d11/n) through (2×d61/n) to the correction data (D10+S) through (D60+S), respectively, which are stored in the register 67 and stores the added results in the register 67.

In the next horizontal scanning period, the output of the Y address counter 61 is also 1. Accordingly, the differential data d01 through d61 of the second adjusting line, which are stored in the field memory 44, are read out in order every time when the clock CLK is input. The differential data is supplied to the divider 65 via the adder 47 and after being multiplied by 2/n, it is supplied to the adder 66. When the data (2×d01/n) is input to the adder 66, the data (D00+S+2×d01/n) stored in the register 67 is input to the adder 66 from the latch 68, and the adder 66 adds up both data and supplies the data (D00+S+2×2×d01/n) to the register 67 for retention. Similarly, the data (D10+S+2×2×d11/n) through (D60+S+2×2×d61/n) are stored in the register 67 every time when the clock CLK is input.

Hereinafter, until a data "2" is output from the Y address counter 61 in the similar manner, the data of m (=7) pieces stored in the register 67 become larger by (2×d02/n) through (2×d62/n), respectively. When address 1 is output by n/2 times from the Y address counter 61, the data (D00+S+d01) through (D60+S+d61), that is, (D01+S) through (D61+S) are stored in the register 67. As a result, the correction data for the correction executing points of the second adjusting line are reproduced.

When the frequency divider 63 counts the n/2 pieces of horizontal sync signals and outputs the pulse to the Y address counter 61, the address of the Y address counter 61 becomes 2. As a result, the differential data d02 through d62 of the third adjusting line of the field memory 44 are read out in order whenever the clock CLK is input. Thereafter, until such a time when the same operation is repeated and the address of the Y address counter 61 becomes 3, data of m=7 pieces stored in the register 67 become larger by (2×d02/n) through (2×d62/n), respectively. Thus, after the n/2 pieces of clocks CLK, the data (D02+S) through (D62+S) are restored in the register 67.

The data stored in the register 67 are output to the D/A converter 51 via the latch 68 in the next horizontal scanning period. The correction data of the correction executing points of the adjusting lines are interpolated linearly for each scanning line and output from the register 67. Further, an interpolation data of the Y adjusting line from the prescribed correction executing point Dxy is expressed by the following expression (1).

$$D_{xy}+2\times d_x(y+1)\times Y/n+S \quad (1)$$

FIG. 17 is a graph showing the interpolation status with the convergence correction signal levels plotted on the vertical axis and the time base on the horizontal axis at the valid number of scanning lines 0 through 240, for each field shown in full scale with one horizontal scanning period as a unit. The white circles in the figure show the correction data of the correction executing points of the vertical one row at the prescribed horizontal location on the screen. For instance, the white circles correspond to correction data such as that of any of D00 through D04. Further, FIG. 17 shows an example where 7 correction executing points are assigned in the vertical direction. As described above, correction data at the correction executing points are interpolated linearly between these white circles for each horizontal scanning so that the correction signal can be output for all horizontal scanning periods.

As described above, on a conventional digital convergence apparatus, a correction signal is obtained for each scanning line and the position of the scanning line is corrected by controlling the deflection of electron beam on the basis of the correction signal. However, there was such a problem that the lateral stripes of the scanning lines become conspicuous as the same correction signal is used in both the odd field and the even field.

FIG. 18 is a diagram for explaining this problem. The square marks in FIG. 18 represent the scanning line positions before the correction in the odd and even fields, while the circles represent the scanning line positions after the correction. FIG. 18 shows the correction of the scanning line positions in the vertical direction in response to the correction signals.

In FIG. 18, it is shown that the scanning lines A1, A2, . . . in the odd field before the correction, were moved in the vertical direction by, for instance, +12, +8, +4, 0, −4, −8 and −12. The "+" sign represents the upward direction, while the "−" sign represents the downward direction. By this correction, the scanning lines A1', A2', . . . in the odd field are displaced to the positions with the circles. On the other hand, the same correction is performed for the scanning lines B1m B2, . . . in the even field. That is, the scanning lines B1, B2, . . . in the even field are moved in the vertical direction by +12, +8, +4, 0, −4, −8 and −12, respectively. As a result, the scanning lines B1', B2'. . . in the even field are displaced to the positions shown by the circles.

However, as a result of this correction, the distances between the scanning lines comprising one frame will become no longer uniform. For instance, the distance between the scanning lines A1' and B1' after the correction is narrow and the distance between the scanning lines B1' and A2' after the correction is wide as shown in FIG. 18. That is, as an interlaced scanning was carried out, the density of the scanning lines in a frame is made rough and fine as a result of the same correction in the odd and even fields and the lateral stripes of the scanning lines become conspicuous, thus deteriorating the quality of picture. In particular, on projection type television receivers with a large screen, there was a problem that the quality of picture deteriorates remarkably.

On a conventional digital convergence apparatus as described above, there was such a problem that the density of the scanning lines lacks uniformity as a result of using the same correction data in the odd and even fields, making the lateral stripes conspicuous, and thus the quality of picture is deteriorated.

SUMMARY OF THE INVENTION

It is, therefore, an object of the present invention to provide a digital convergence apparatus which is capable of preventing the density of scanning lines from lacking uniformity, thus promoting the quality of picture.

In order to achieve the above object, a digital convergence apparatus according to one aspect of the present invention includes a first memory for storing data for the convergence correction corresponding to plural correction executing points aligned in the horizontal or vertical direction of a screen, a first static convergence data memory for storing a first static convergence correction data for correcting the entire screen in the same direction, a second static convergence data memory for storing a second static convergence correction data different from the first static convergence correction data only by an amount corresponding to the distance between the scanning lines, selecting means for selecting the output of the first or the second static convergence data memory according to the odd field period or the even field period, adding means for adding the output of the selecting means to the data stored in the first memory, and vertical interpolating means for interpolating the output of the adding means in the vertical direction and supplying it to a convergence correction coil.

A digital convergence apparatus according to another aspect of the present invention includes a horizontal convergence data memory for storing convergence correction data corresponding to the horizontal direction on a screen for plural correction executing points aligned in the horizontal or vertical direction of the screen, a vertical convergence data memory for storing the convergence correction data corresponding to the vertical direction on a screen for plural correction executing points, a horizontal static convergence data memory for storing a horizontal static convergence correction data for correcting the entire picture in the horizontal direction, a first static convergence data memory for storing a first static convergence correction data for correcting the entire picture in the vertical direction; a second static convergence data memory for storing a second static convergence correction data different from the first static convergence correction data by an amount corresponding to the distance of the scanning lines, address control means for controlling the read of the horizontal and vertical memory, selection means for selecting the output of the first or the second static convergence data memory according to the odd field period or the even field period, horizontal adding means for adding up the convergence correction data stored in the horizontal convergence data memory with the horizontal static convergence correcting data, vertical adding means for adding up the convergence correction data with the output of the selection means; horizontal interpolation means for calculating the convergence correction data at prescribed positions in the horizontal direction between plural correction executing points based on the output of the horizontal adding means, vertical interpolation means for calculating the convergence correction data at prescribed positions in the vertical direction between plural correction executing points, a horizontal convergence correction coil to which the output of the horizontal interpolation means is supplied, and a vertical convergence correction coil to which the output of the vertical interpolation means is supplied.

A digital convergence apparatus according to still another aspect of the present invention includes a first memory for storing the convergence correction data corresponding to plural correction executing points aligned in the horizontal or the vertical direction of a screen, a static convergence data memory for storing a static convergence correction data for correcting the entire picture in the same direction, an offset data memory for storing a first offset data to the odd field and for storing a second offset data to the even field in response to the distance between the scanning lines to the static convergence correction data, selection means for selecting and reading the first or the second offset data stored in the offset data memory according to the odd field period or the even field period, adding means for correcting the static convergence correction data stored in the static convergence data memory by the output of the selection means and for adding the corrected static convergence correction data to the data stored in the first memory, and vertical interpolation means for interpolating the output of the adding means and for supplying them to the convergence correction coil.

In the first aspect of the digital convergence apparatus according to the present invention, the first memory stores the convergence correction data corresponding to the plural correction executing points. Further, the first or the second static convergence correction data for correcting the entire picture in the same direction is stored in the first or the second static convergence correction data for correcting the entire picture in the same direction is stored in the first or the second static convergence memories, respectively. In the odd field, the output of the first static convergence data memory is selected by the selection means and the first static convergence correction data is added to the data from the first memory. In the even field, the output of the second static convergence data memory is selected by the selection means and the second static convergence correction data is added to the data from the first memory. The output from the adding means is interpolated in the vertical direction by the vertical interpolation means and supplied to the convergence correction coil. The second static convergence correction data is set at a data different from the first static convergence correction data by an amount corresponding to the distance between the scanning lines. As a result, the distance between the scanning lines becomes uniform after the convergence correction was made.

In the second aspect of the digital convergence apparatus according to the present invention, the convergence correction data corresponding to the horizontal and the vertical direction are stored in the horizontal and the vertical convergence memories, respectively. The horizontal static convergence correction data for correcting the entire picture in the horizontal direction is stored in the horizontal static convergence data memory. The first and the second static convergence correction data for correcting the entire picture are stored in the first and the second static convergence memories, respectively. The first or the second static convergence correction data is selected and output by the selection means according to the odd field period or the even field period. As to the vertical direction, the output of the selection means is added to the convergence correction data stored in the vertical convergence data memory by the vertical adding means. The output of the vertical adding means is interpolated for each scanning line by the vertical interpolation means and supplied to the vertical convergence correction coil. This makes the distance between the scanning lines uniform in the vertical direction after the correction was made.

In the third aspect of the digital convergence apparatus according to the present invention, the convergence correction data corresponding to plural correction executing points are stored in the first memory and the static convergence correction data for correcting the entire picture in the same direction are stored in the static convergence data memory. The offset data memory stores the first offset data corresponding to the odd field for the static convergence correction data and the second offset data corresponding to the even field. The selection means selects the first or the second offset data according to the odd field period or the even field period. After the static convergence correction data is corrected by the adding means, with the selected offset data, the corrected static convergence correction data is added to the data stored in the first memory to make the distance between the scanning lines after the correction uniform.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
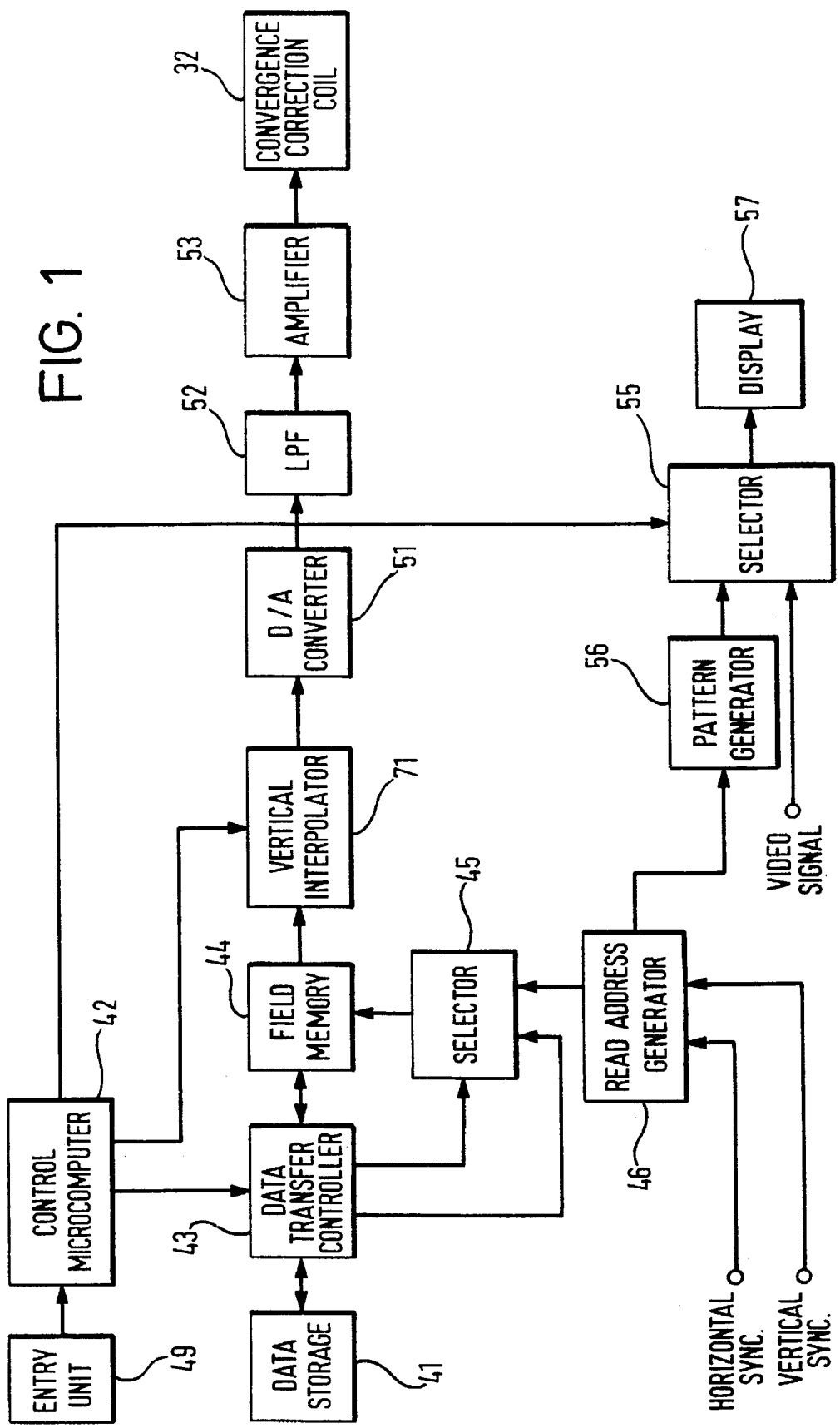
FIG. 1 is a block diagram showing a first embodiment of the digital convergence apparatus of the present invention.
Figure 12:
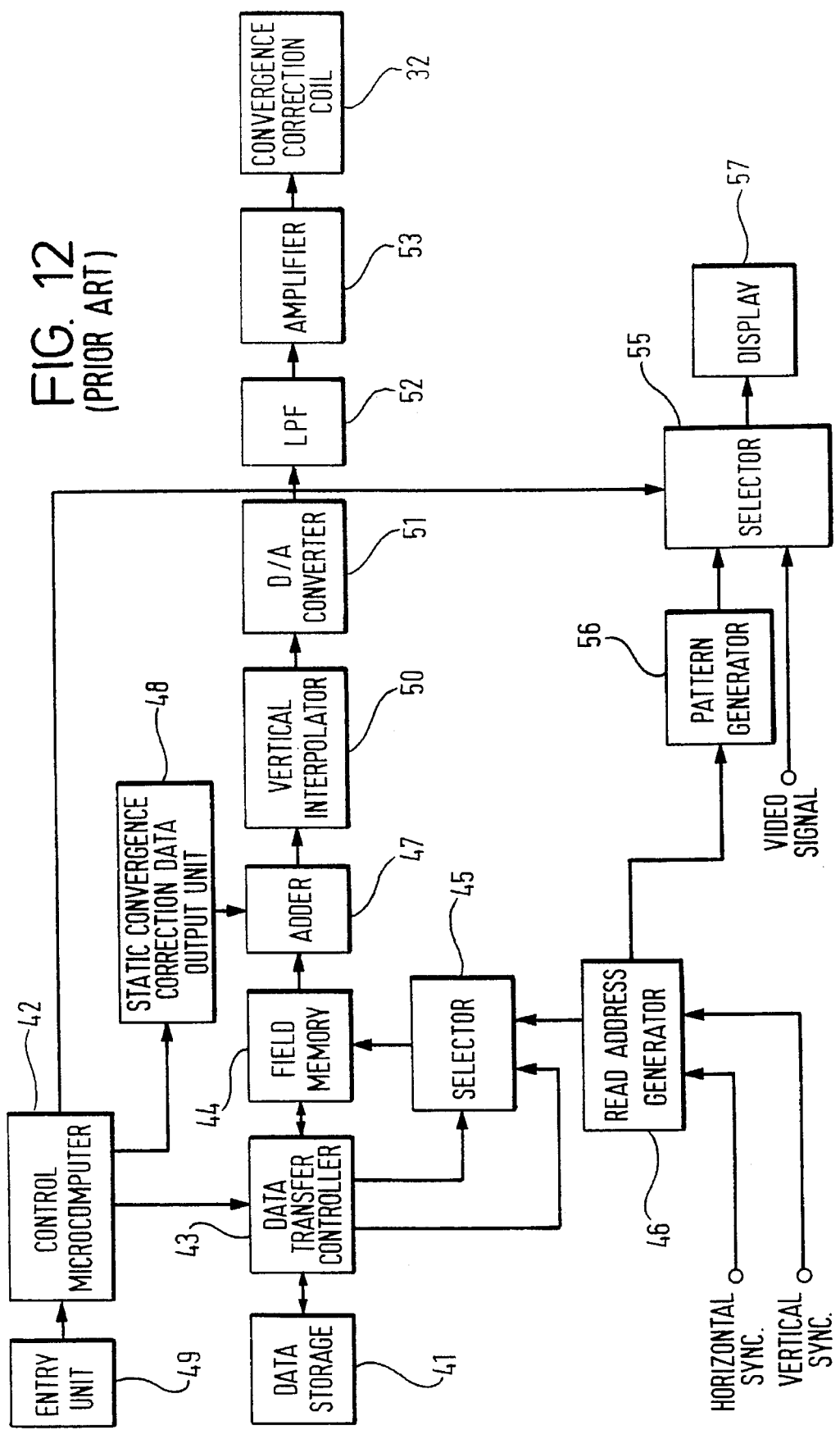
FIG. 12 is a block diagram showing a conventional digital convergence apparatus.

Hereinafter, preferred embodiments of the present invention will be described in reference to the attached drawings. FIG. 1 is a block diagram showing a first embodiment of a digital convergence apparatus according to the present invention. In FIG. 1, the same elements as those shown in FIG. 12 are assigned with the same reference numerals.

Horizontal and vertical sync signals separated from video signals are provided to a read address generator 46. The read address generator 46 having an arrangement the same as the section 46 defined by the broken line in FIG. 13 generates correction data read addresses (X address, Y address) based on the horizontal and vertical sync signals, and then outputs them to a selector 45. An entry unit 49 provides data to a control microcomputer 42 according to the manipulation by an operator. The control microcomputer 42 controls a data transfer controller 43 so that convergence correction data is supplied from a data storage 41 to a field memory 44 via the data transfer controller 43. In the field memory 44, the correction data is stored for the correction executing points of the first adjusting line and a differential data of the correction data between the correction executing points is stored for the correction executing points of the second and subsequent adjusting lines. Further, the correction data and the differential data of the correction executing points include convergence correction data in the horizontal and vertical directions. The correction executing points are those points on the odd field.

The data transfer controller 43 controls the selecting operation of the selector 45 and provides a write address to the field memory 44 via the selector 45 or a read address from the read address generator 46 to the field memory 44 via the selector 45. Thus, the selector 45 gives the write address to the field memory 44 for data transfer and the read address to the field memory 44 for scanning. The data transfer controller 43 reads out the correction data and the differential data stored in the data storage 41. The write address is then transferred to the field memory 44 via the selector 45 to store the correction data and the differential data in the address corresponding to the position on the screen.

In this embodiment, the correction data or the differential data read out of the field memory 44 is supplied to a vertical interpolator 71. Normally, as only a few correction executing points are assigned in the vertical direction, the vertical interpolator 71 is used to interpolate correction data between the correction executing points in the vertical direction. Thus, the correction data is obtained for each of all the scanning lines. The output of the vertical interpolator 71 is given to a D/A converter 51. The D/A converter 51 converts the correction data into the analog correction signal and outputs that signal to an LPF 52. The LPF 52 interpolates the analog correction signal in the horizontal direction by eliminating the harmonic component, and outputs the interpolated correction signal to an amplifier 53. The amplifier 53 amplifies the correction signal, and supplies it to a convergence correction coil 32. The convergence correction coil 32 improves the convergence by controlling the deflection of the electron beam according to the correction signal.

Further, the output of the read address generator 46 is also supplied to a pattern generator 56. The pattern generator 56 generates a pattern signal to indicate the convergence correction pattern and outputs the signal to the selector 55. The selector 55, controlled by the control microcomputer 42, selects either a video signal or the convergence correction pattern signal, and supplies the selected signal to a display 57. The display 57 displays the signal input from selector 55 while the deflection of the screen is controlled by the convergence correction coil 32.

Figure 2:
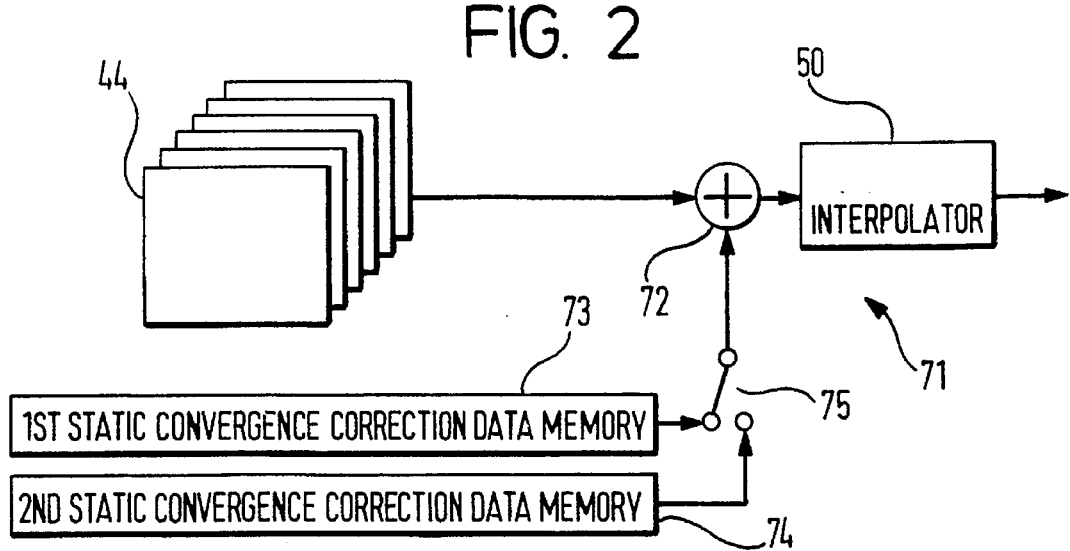
FIG. 2 is a block diagram showing the vertical interpolator 71 shown in FIG. 1.

FIG. 2 is a block diagram showing the definite construction of the vertical interpolator 72 shown in FIG. 1.

The vertical interpolator 72 is comprised of a vertical interpolator 50, an adder 72, a first static convergence correction data memory 73, a second static convergence correction data memory 74 and a switch 75. The output of the field memory 44 is supplied to the adder 72. The adder 72 adds the static convergence correction data to the correction data read out of the field memory 44, and outputs the results to the vertical interpolator 50. In this embodiment, the static convergence correction data S1 from the first static convergence correction data memory 73 and the static convergence correction data S2 from the second static convergence correction data memory 74 are selected, and supplied to the adder 72 as the static convergence correction data.

The first static convergence correction data memory 73 stores the static convergence correction data S1. The static convergence correction data S1 is for correcting the deviation of the static convergence generated by the effects of the earth magnetism due to the direction of installation, the secular change, etc. The second static convergence correction data memory 74 stores the static convergence correction data S2 which is obtained by further correcting the static convergence correction data S1 in response to the distance between the scanning lines in the odd and even fields. For instance, an optimum data obtained while observing the convergence correction pattern in the actual convergence correction may be set as the static convergence correction data S2. These static convergence correction data S1 and S2 may also be modified by the control microcomputer 42.

The outputs of the first and the second static convergence correction data memories 73 and 74 are given to the adder 72 through the switch 75. The switch 75 selects the output of the first static convergence correction data memory 73 in the odd field and the output of the second static convergence correction data memory 74 in the even field and gives the selected output to the adder 72. The adder 72 adds the correction data with the static convergence correction data S1 or S2 and outputs the summation to the vertical interpolator 50 and along with the differential data.

Figure 13:
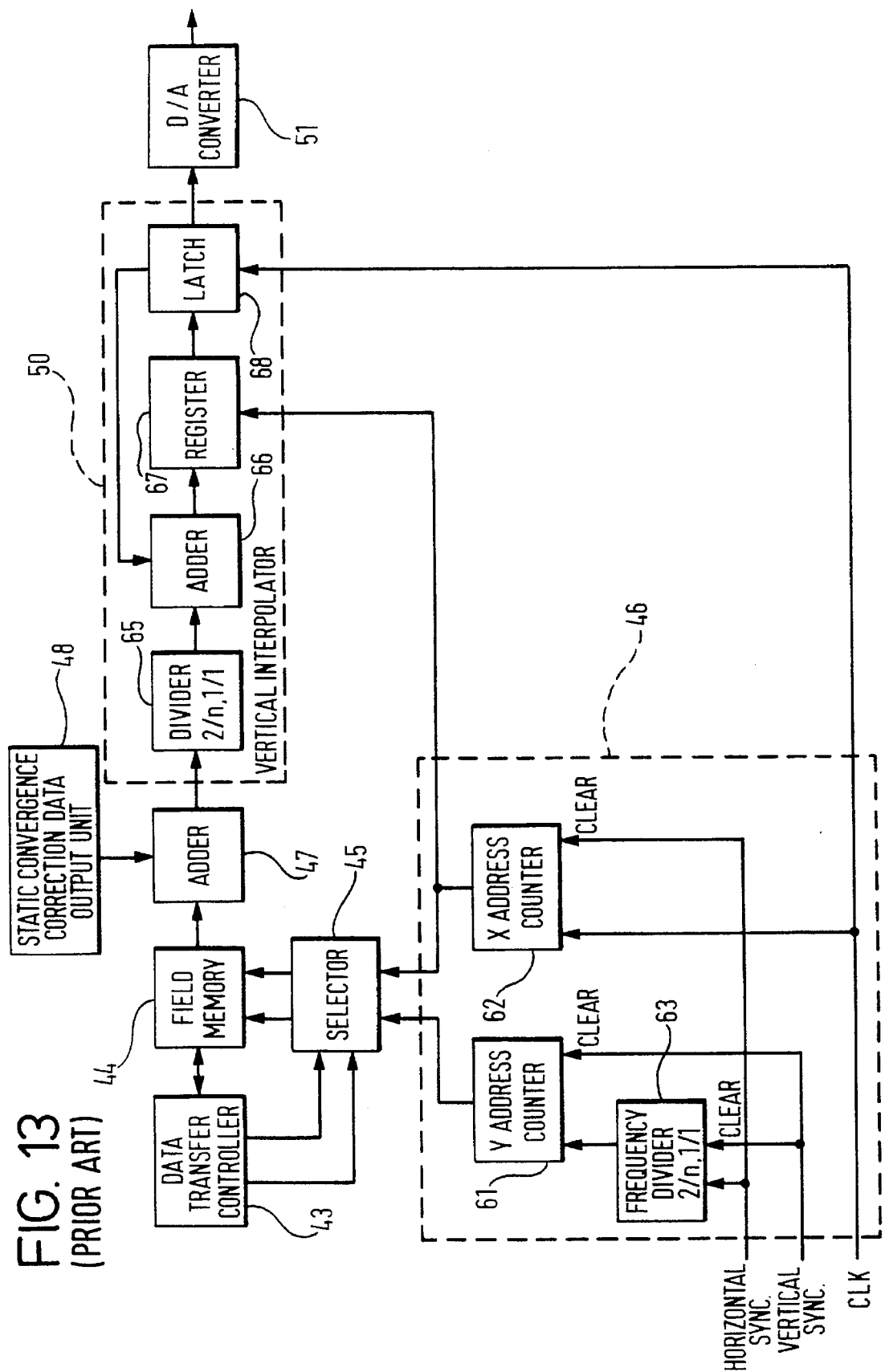
FIG. 13 is a block diagram showing the vertical interpolator 50 shown in FIG. 12.
Figures 14, 15, 16:
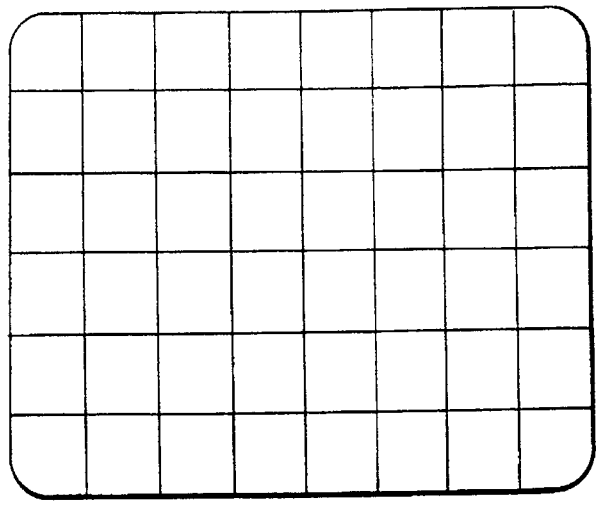
FIG. 14 is a drawing for explaining correction executing points.
FIG. 15 is a drawing for explaining correction data.
FIG. 16 is a drawing for explaining data stored in a field memory.
Figure 17:
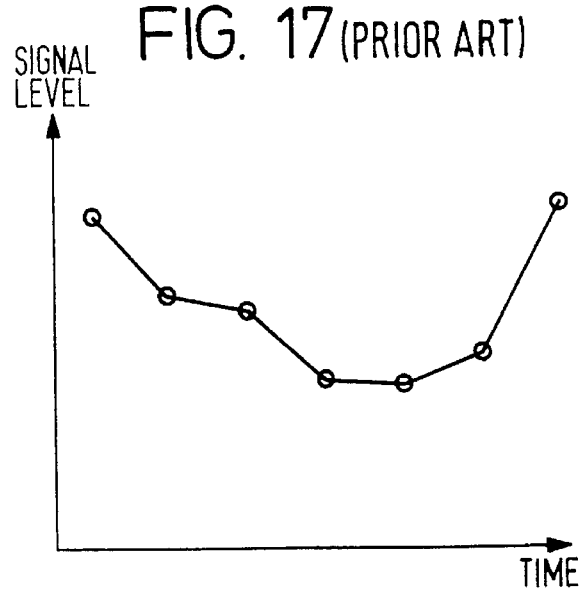
FIG. 17 is a graph for explaining the vertical interpolation of correction data.
Figure 18:
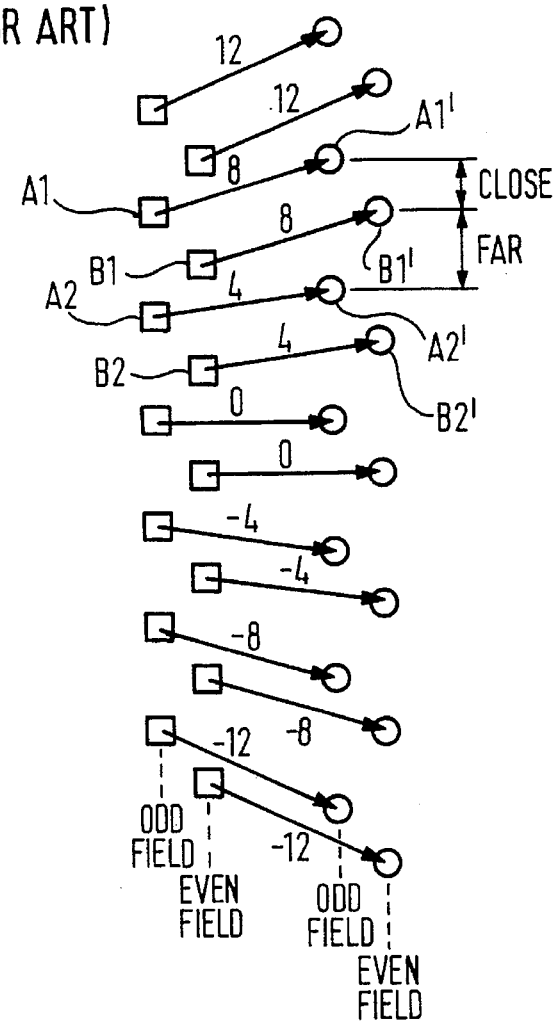
FIG. 18 is a drawing for explaining problems involved in a conventional embodiment.

The vertical interpolator 50 is similar in construction to the broken lined portion 50 shown in FIG. 13. It is comprised of a divider which divides the differential data by a divisor, an adder, a register, and a latch. The vertical interpolator 50 divides the differential data by a divisor that is based on the number of scanning lines to be interpolated, and by adding the result of this division to the correction data which has the static convergence correction data added. The vertical interpolator 50 then interpolates and outputs the correction data for each of all the scanning lines between the correction executing points.

Figure 3:
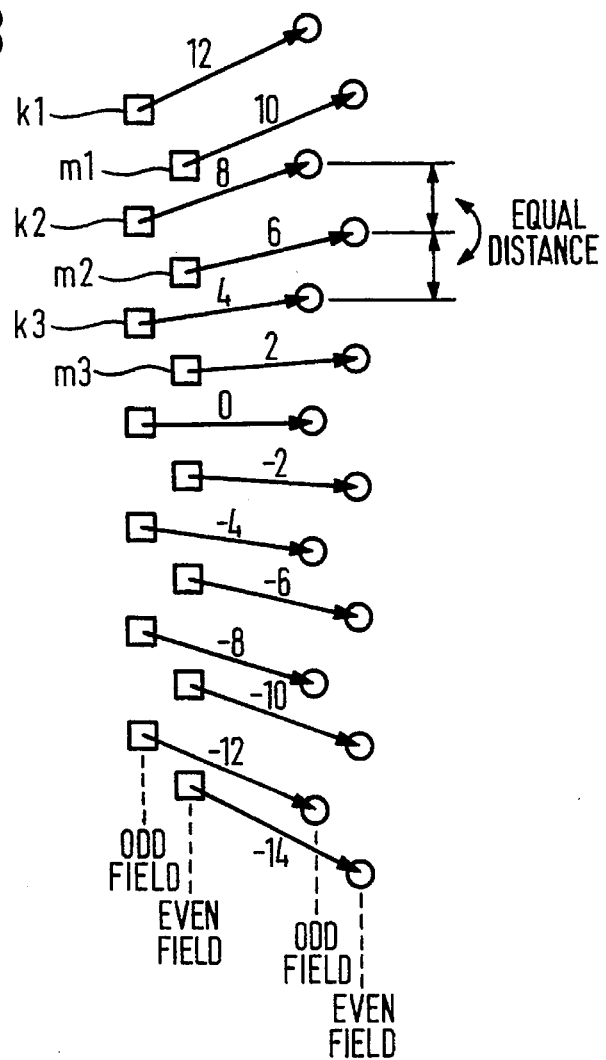
FIG. 3 is a drawing for explaining the operation of the first embodiment.

In the following, the operation of the embodiment in the construction as shown above will be described referring to the explanatory diagram shown in FIG. 3. FIG. 3 shows the positions of the scanning lines before and after the convergence correction. The square marks represent the positions of the scanning lines in the odd and even fields before the correction, while the circles represent the positions of the scanning lines after the correction.

The convergence correction is carried out before the shipment of the apparatus. First, the operator generates a convergence correction pattern to be displayed by manipulating the entry unit 49. The pattern signal from the pattern generator 56 is supplied to the display 57 via the selector 55, and for instance, a crosshatch pattern is displayed on the screen (not shown) of the display 57.

The operator performs the convergence correction for each correction executing point by manipulating the entry unit 49 while observing the screen. The data from the entry unit 49 is given to the control microcomputer 42. The control microcomputer 42 gives the data corresponding to the correction executing point of the first adjusting line at the upper end of the screen directly to the data storage 41 and the field memory 44 as the correction data, and gives the differential data with the correction data of the correction executing point of the preceding adjusting line to the data storage 41 and the field memory 44. Through this convergence correction, the deviation of the static convergence such as errors resulting from the electron gun assembling, etc. is corrected.

In the normal video display, the correction data is obtained for each of all the scanning lines using the correction data, the differential data stored in the data storage 41, and the static convergence correction data considering the effects of the place of installation and secular change. The data transfer controller 43 is controlled by the control microcomputer 42 to transfer the correction data and the differential data to the field memory 44. The read address generator 46 gives the read address (X address, Y address) to the field memory 44 via the selector 45. In this case, the read address is generated at the horizontal cycle and the same Y address continues by the number of times responsive to the number of scanning lines between the correction executing points in the vertical direction.

The correction data from the field memory 44 is supplied to the vertical interpolator 71. The correction data is added with the static convergence correction data by the adder 72 of the vertical interpolator 71. In the example shown by FIG. 3, +(12–S1) is stored in the field memory 44 as the correction data in the vertical direction of the correction executing point K1 at the prescribed horizontal position of the prescribed adjusting line. The "+" sign of the correction data represents a convergence correction data in the upward direction, while the "−" sign represents a convergence correction data in the downward direction. (In this example, it is assumed that the number of scanning lines between the correction executing points in the vertical directions is "n", and that the difference between (differential data) the correction data for the correction executing point K1 and the correction data for the correction executing point K2 of the next adjusting line at the same horizontal position is −2n.

FIG. 3 shows the status of the correction of the scanning lines in the odd and even fields between the correction executing points K1 and K2.

In the odd field, the correction data +(12–S1) in the vertical direction for the correction executing point K1 which is read out of the field memory 44 is supplied to the adder 72. In the odd field, the switch 75 select the first static convergence correction data memory 73. Thus the static convergence correction data S1 stored in the static convergence correction data memory 73 is supplied to the adder 72. The adder 72 adds the static convergence correction data S1 to the correction data and outputs +12 via the vertical interpolator 50.

The output of the vertical interpolator 50 is converted into analog signal by the D/A converter 51, subject to the restriction of the band by the LPF 52, and, after being amplified by the amplifier 53, is supplied to the convergence correction coil 32. The scanning line k1 of the correction executing point K1 in the odd field moves upward by the amount of movement corresponding to the correction data +12 according to the correction signal supplied to the vertical convergence correction coil of the convergence correction coil 32 as shown in FIG. 3.

In the odd field, the differential data −2n is read out of the field memory 44 when the scanning line k2 next to the scanning line k1 of the correction executing point K1 is input. The vertical interpolator 71 gives the differential data −2n to the vertical interpolator 50. The vertical interpolator 50 multiplies the differential data by 2/n and adds it to the correction data of the scanning line of the correction executing point K1. Thus, +12−4=8 is output as the correction data from the vertical interpolator 50. This correction data is supplied to the convergence correction coil 32 through the D/A converter 51, the LPF 52 and the amplifier 53. As a result, in the odd field the next scanning line k2 of the correction executing point K1 moves in the vertical upward direction by the amount of movement corresponding to the correction data +8. Thereafter, the correction data is obtained for each of all the scanning lines between the correction executing points K1 and K2 in the same manner.

Next, in the even field the scanning line m1, which is next to the scanning line k1 of the correction executing point K1, is corrected. In this case, the correction data of the correction executing point K1 is also used. The correction data +(12−S1) from the field memory 44 is supplied to the adder 72 of the vertical interpolator 72. The switch 75 selects the output of the second static convergence correction data memory 74 in the even field. Thus the static convergence correction data S2 is supplied to the adder 72. In this embodiment, a numerical data (S1−2) corresponding to the data "2" which represents the scanning line distance is set as the static convergence correction data S2.

The adder 72 adds up the read correction data with the static convergence correction data S2 and outputs (12−S1)+(S1−2)=10 as the correction data. This correction data is supplied to the convergence correction coil 32 from the vertical interpolator 71 through the D/A converter 51, the LPF 52 and the amplifier 53. Thus, the scanning line m1 is corrected in the upward direction by the amount of movement corresponding to the correction data +10 as shown in FIG. 3.

As to the next scanning line m2 in the even field, the correction data is obtained using the differential data −2n between the correction executing points K1 and K2. The differential data −2n read out of the field memory 44 is multiplied by 2/n by the divider Of the vertical interpolator 50 and added to the correction data of the scanning line m1. That is, +10−4=6 is output from the vertical interpolator 71. The convergence is corrected according to this correction data and the scanning line m2 moves in the upward direction by 6 as shown in FIG. 3. Thereafter, in the same manner as above, the correction data is obtained for each of all the scanning lines in the even field between the correction executing points K1 and K2 and the convergence is corrected.

As described above, in this embodiment static convergence correction data which are different between the odd field and the even field are used and the correction data of the odd field different from that of the even field by a data equivalent to the distance between the scanning lines, accordingly. This makes it possible to make the distance between the scanning lines after the correction uniform and prevent the lateral stripes by the interlaced scanning from becoming conspicuous.

Figure 4:
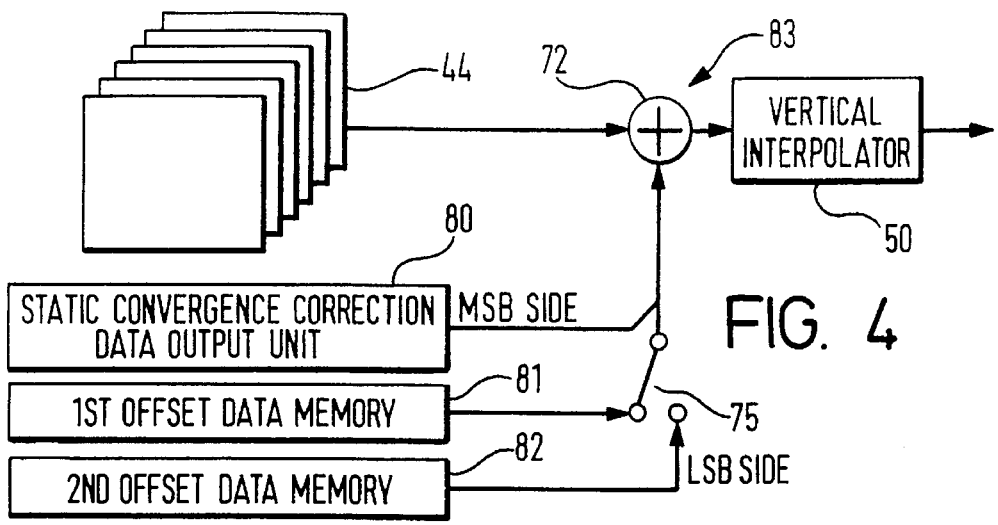
FIG. 4 is a block diagram showing a second embodiment of the present invention.

FIG. 4 is a block diagram showing a second embodiment of the present invention, presenting the definite construction of the vertical interpolator. In FIG. 4, the same elements as those shown in FIG. 2 are assigned with the same reference numerals and the explanations are omitted.

This embodiment is different from the embodiment shown in FIG. 1 only in the construction of a vertical interpolator 83. In FIG. 4, the vertical interpolator 83 is comprised of a static convergence correction data output unit 80, a first offset data memory 81, a second offset data memory 82, the switch 75, the adder 72 and the vertical interpolator 50. The static convergence correction data output unit 80 stores the static convergence correction data S for correcting the deviation of the static convergence generated by the effects of the earth magnetism against the installing direction, secular change, etc. after the shipment of the projection type television receivers and the like.

This static convergence correction data S is supplied to the adder 72. The output of the first or the second offset data memory 81 or 82 is given to the adder 72 through the switch 75. An offset data in the vertical direction for preventing the density of the scanning lines from lacking uniformity in the odd and even fields after the convergence correction is very small. Therefore, the correction data for the odd and even fields are corrected by adding an offset data to the static convergence correction data S in this embodiment.

The first offset data memory 81 is a type of register for storing a first offset data for correcting the correction data in the odd field, while the second offset data memory 82 is also a type of register for storing a second offset data for correcting the correction data in the even field. The switch 75 gives the first offset data to the adder 72 in the odd field period, while the second offset data to the adder 72 in the even field period. The adder 72 adds the first or the second offset data to the correction data from the field memory 44, thereby preventing the density of the scanning lines from lacking uniformity resulting from offset of the positions of the scanning lines of the odd and even fields.

Relatively high precision is required for convergence correction. Thus, the correction data is comprised of 12 bits more than 8 bits adopted for general video signals. However, it is generally sufficient for the static convergence correction data to be represented by 8 bits corresponding to 256 variations. In this embodiment, therefore, for instance, 8 bits in the most significant bit (MSB) side of the static convergence correction data S are given to the adder 72 and, for instance, 4 bits in the least significant bit (LSB) side of the first or the second offset data is given to the adder 72.

In the following, the operation of the embodiment in the construction as described above will be explained.

In the odd field, the switch 75 selects the output of the first offset data memory 81. When the correction data on the first correction pattern line are read out from the field memory 44, the adder 72 adds the 8 bits of the MSB side of the static convergence correction data with the 4 bits of the LSB side of the first offset data from the switch 75. Further, in the even field, the switch 75 selects the output of the second offset data memory 82 and gives to the adder 72. As a result, in the even field, the correction data of the first adjusting line added with the second offset data are supplied to the vertical interpolator 50.

When the first offset data and the second offset data are set in response to the distance between the scanning lines, it becomes possible to make the scanning line distance uniform after the correction likewise the embodiment shown in FIG. 2. Other operations are the same as those of the embodiment shown in FIG. 2.

This embodiment has an advantage that the memory capacity can be reduced to less than that of the embodiment shown in FIG. 2 as it is sufficient enough to provide one memory for storing the static convergence correction data and two memories for storing the offset data.

Figure 5:
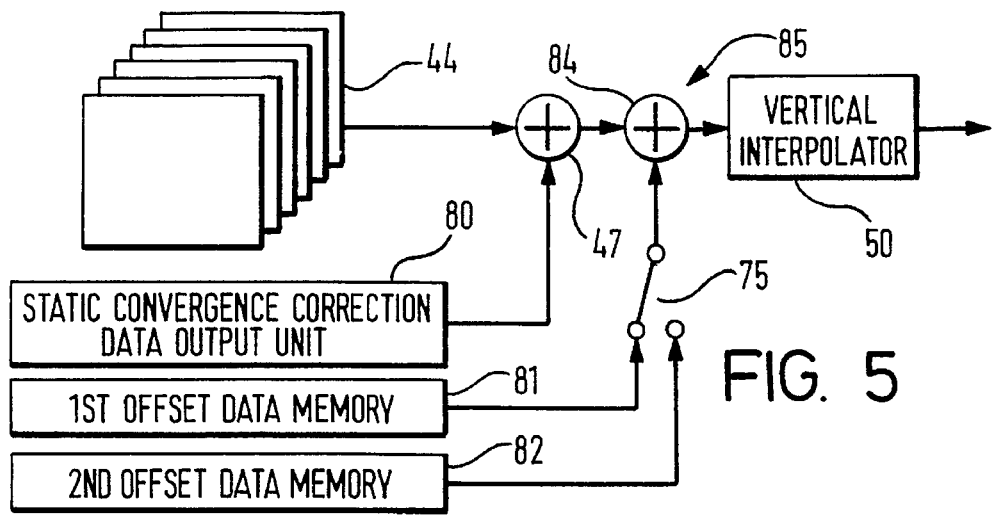
FIG. 5 is a block diagram showing a third embodiment of the present invention.

FIG. 5 is a block diagram showing a third embodiment of the present invention, presenting the definite construction of the vertical interpolator. In FIG. 5, the same elements as those shown in FIG. 4 will be assigned with the same reference numerals and the explanations will be omitted.

The vertical interpolator 85 of this embodiment is different from the vertical interpolator of the embodiment shown in FIG. 4 in that the adders 47 and 84 are provided instead of the adder 72. The adder 47 adds the static convergence correction data S from the static convergence correction data output unit 80 to the correction data from the field memory 44 and outputs the added result to the adder 84. The adder 84 adds the first or the second offset data from the switch 75 to the output of the adder 47 and outputs the added result to the adder 84. The adder 84 adds the first or the second offset data from the switch 75 to the output of the adder 47 and outputs the added result to the vertical interpolator 50.

In the embodiment in the construction as described above, the static convergence correction data S is added to the correction data in the adder 47. Further, in the odd field the first offset data is added to the output of the adder 47 by the adder 84, while in the even field the second offset data is added to the output of the adder 47.

Other operations and effects are the same as those of the embodiment shown in FIG. 4.

Figure 6:
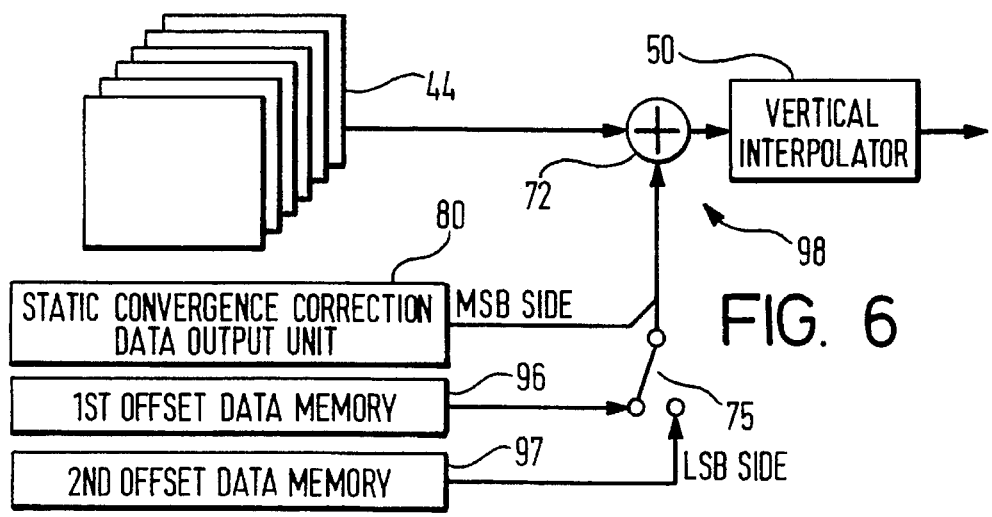
FIG. 6 is a block diagram showing a fourth embodiment of the present invention.

FIG. 6 is a block diagram showing a fourth embodiment of the present invention, presenting the definite construction of the vertical interpolator. In FIG. 6, the same elements as those shown in FIG. 4 are assigned with the same reference numerals and the explanations are omitted.

The vertical interpolator 98 of this embodiment is different from that of the embodiment shown in FIG. 4 in that a first and a second offset data memories 96 and 97 are used for the first and the second offset data memories 81 and 82. In the preceding embodiments, the static convergence correction data are corrected for each field in response to the distance between the scanning lines, while the same correction data are used uniformly on the screen. On the other hand, in this embodiment optimum data corresponding to the positions on the screen are used as the correction data.

In the first and second offset data memories 96 and 97, optimum offset data corresponding to the odd and even field positions on the screen are stored. That is, the first and the second offset data memories 96 and 97 are the field memories to store offset data of the various points on the screen.

In the embodiment in the construction as described above, when the correction data for the correction executing points of the first adjusting line are read out of the field memory 44 in the odd field, the adder 72 adds up the MSB of the static convergence correction data S and the LSB of the offset data from the first offset data memory 96. In this case, an optimum offset data is added according to the location on the screen. Thus, the convergence of the screen of the odd field is corrected with the high precision.

When the correction data for the correction executing points of the first adjusting line are read out of the field memory 44 in the even field, the adder 72 adds up to MSB of the static convergence correction data S with the LSB of the offset data from the second offset data memory 97. Thus, the convergence of the screen of the even field is corrected with the high precision.

In this embodiment it is clear that it is possible to make the scanning line distances after the convergence correction uniform when the offset data to be stored in the first and the second offset data memories 96 and 97 are set in response to the distance between the scanning lines. In this embodiment it is possible to make the satisfactory correction of the convergence uniformly on the overall screen as optimum offset data corresponding to the positions on the screen are added.

Figure 7:
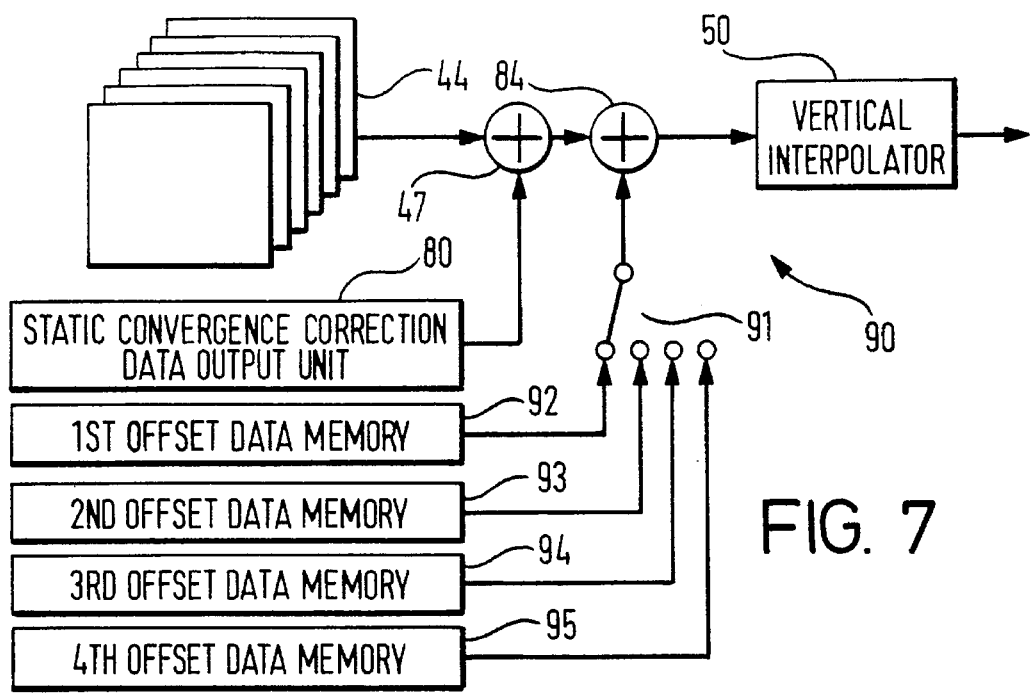
FIG. 7 is a block diagram showing a fifth embodiment of the present invention.
Figure 8:
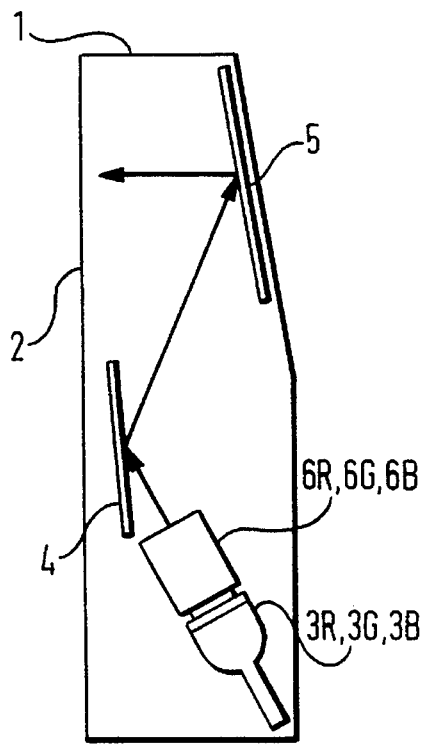
FIG. 8 is an explanatory drawing showing a projection type television receiver.
Figure 9:
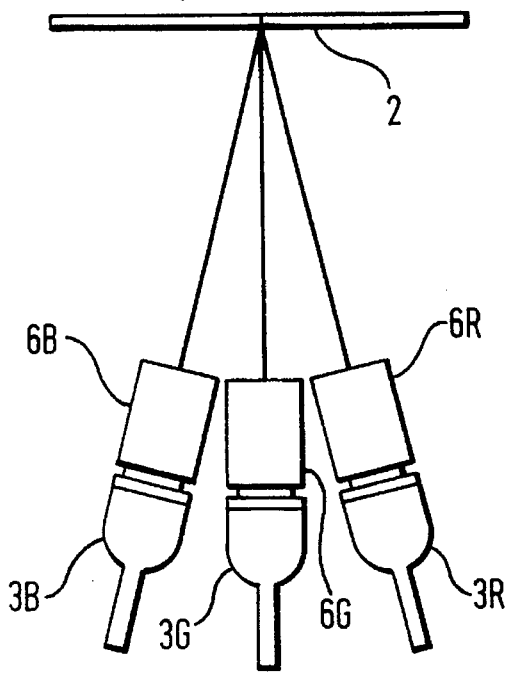
FIG. 9 is an explanatory drawing showing the arrangement of R, G and B projection tubes.
Figure 10:
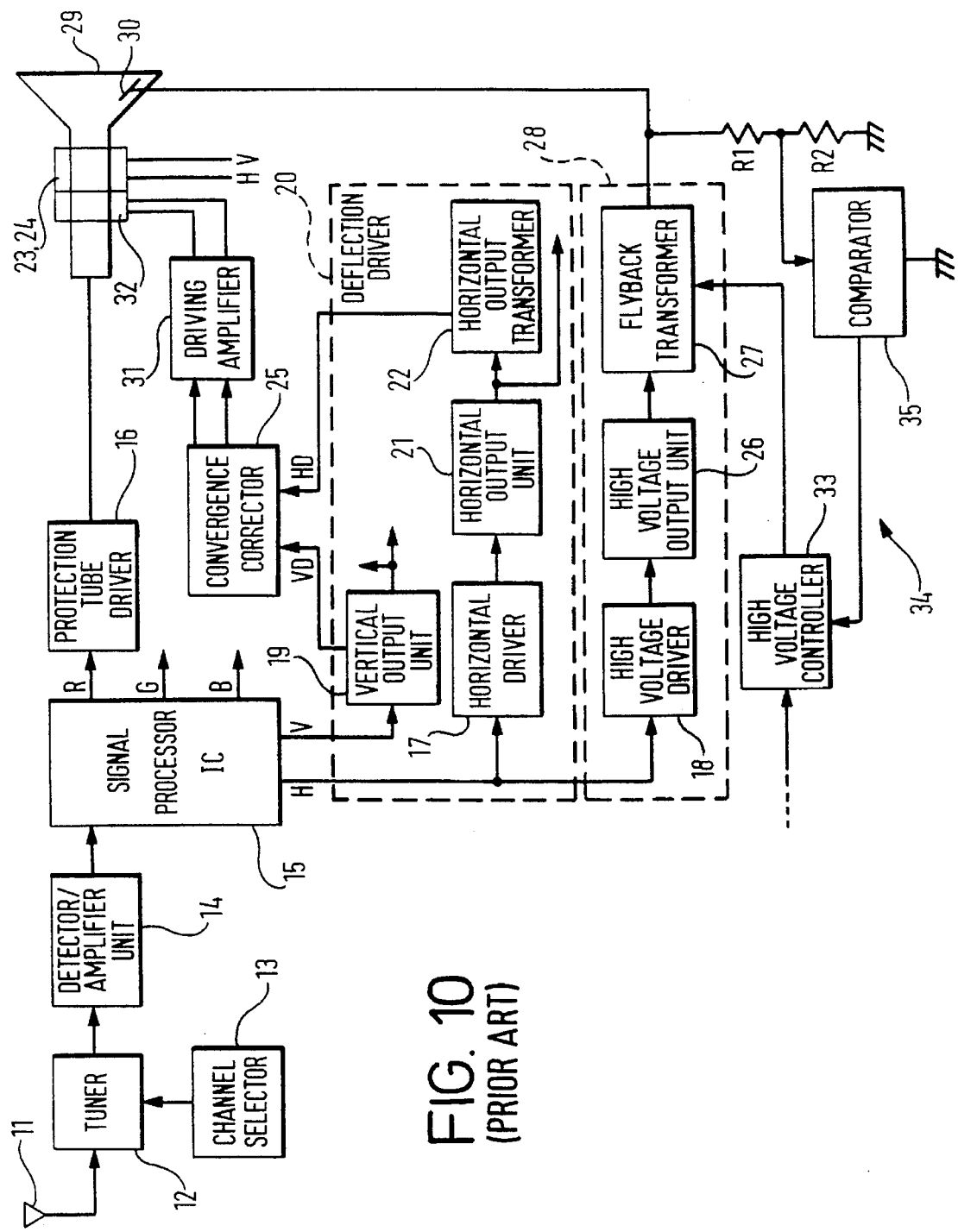
FIG. 10 is a block diagram showing a color television receiver with a convergence correction apparatus incorporated.
Figure 11A:
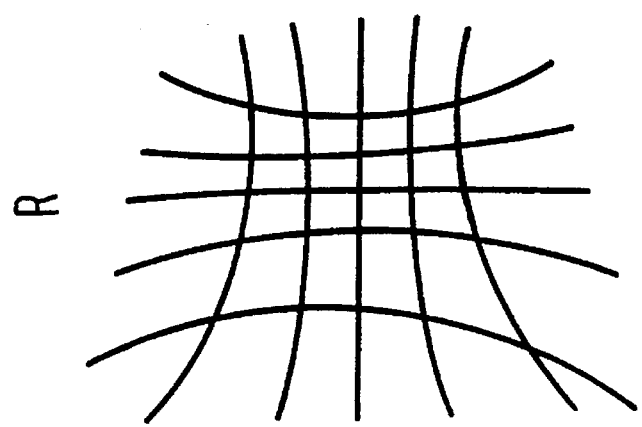
FIGS. 11(a) through 11(c) are explanatory drawings showing crosshatch patterns displayed on a screen.
Figure 11B:
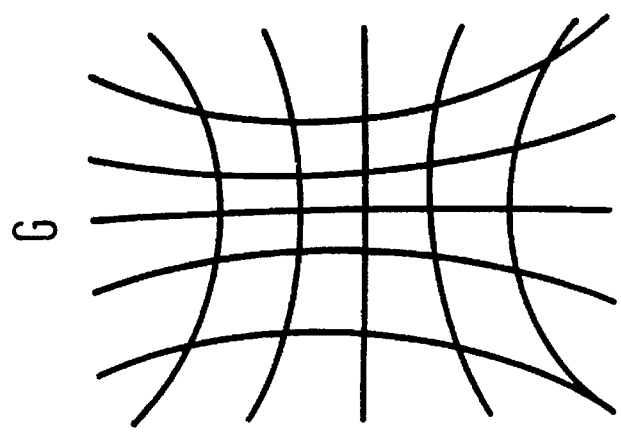
Figure 11C:
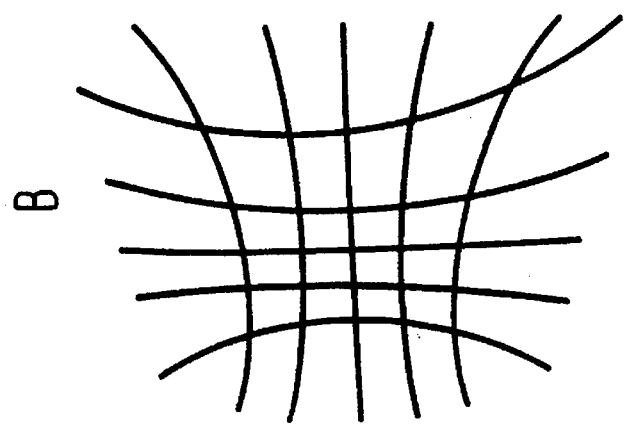

FIG. 7 is a block diagram showing a fifth embodiment of the present invention, presenting the definite construction of the vertical interpolator. In FIG. 7, the same elements as those shown in FIG. 5 are assigned with the same reference numerals and the explanations are omitted. This embodiment enables the correction of the convergence of the HDTV (High Definition Television) system or the ATV (Advanced Television) system using the circuits adopted for the NTSC color television.

The vertical interpolator 90 of this embodiment is different from that of the embodiment shown in FIG. 5 in that a switch 91 is used for the switch 75 and a first through a fourth offset data memories 92 through 95 are provided for the first and the second offset data memories 81 and 82. A switch 91 outputs the outputs of the first through the fourth offset data memories 92 through 95 selectively to the adder 84.

The first and the second offset data memories 92 and 93 are the registers to maintain the first and the second offset data for correcting the correction data in the odd field and the third and the fourth offset data memories 94 and 95 are the registers to maintain the third and the fourth offset data for correcting the correction data in the even field. In the case where video signals of the NTSC color television system are being projected, the switch 91 outputs the output of the first offset data memory 92 in the even field. Further, in the case where the HDTV or the ATV system video of which scanning lines are about two times of the NTSC system video signals is being projected, the switch 91 outputs the outputs of the first and the second offset data memories 92 and 93 by changing over them for every horizontal scanning period in the odd field and the outputs of the third and the fourth offset data memories 94 and 95 by changing over them for every horizontal scanning period in the even field.

In the embodiment as described above, the first through the fourth offset data from the first through the fourth offset data memories are selectively supplied to the adder 84. In the case where the NTSC color television system video signals are being projected, the switch 91 outputs the output of the first offset data memory 92 in the odd field and the output of the third offset data memory 94 in the even field. In this case, the same operations as in the embodiment shown in FIG. 4 are carried out.

In the case where the HDTV or the TVA system video is being projected, the switch 91 selects the outputs of the first and the second offset data memories 92 and 93 in the odd field. That is, the output of the first offset data memory 92 is selected in the odd line of the odd field and the output of the second offset data memory 93 is selected in the even line. Thus, it becomes possible to correct the convergence of the odd field of the HDTV or the ATV system video of which scanning lines are about two times of the NTSC color television system.

In the similar manner, in the odd field, the switch 91 selects the output of the third offset data memory 94 in the odd line and the output of the fourth offset data memory 95 in the even line. Thus, it is enabled to correct the convergence using the NTSC circuits also for the HDTV or the ATV circuits.

Figure 19:
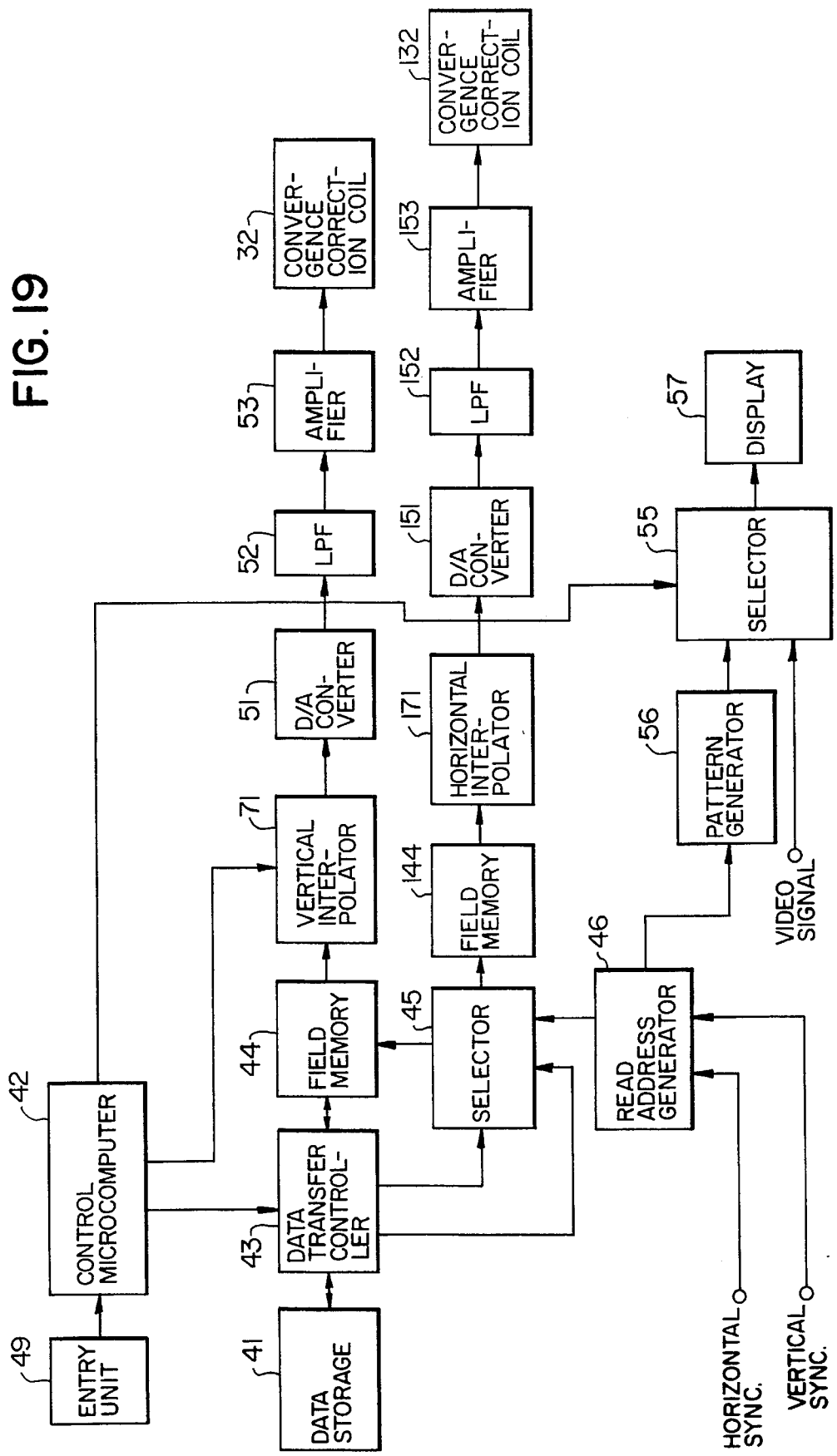
FIG. 19 is a block diagram showing a sixth embodiment of the present invention.
Figure 20:
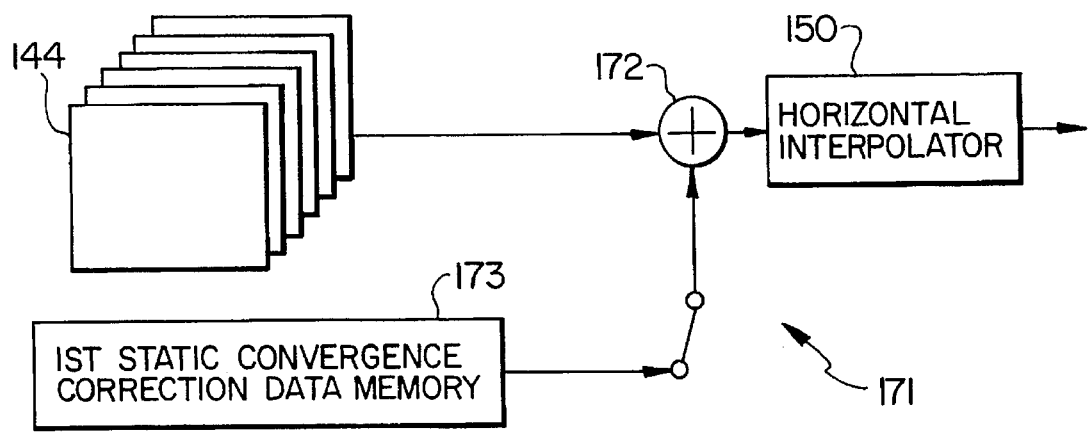
FIG. 20 is a block diagram showing the horizontal interpolator of the sixth embodiment.

FIGS. 19 and 20 are block diagrams showing a sixth embodiment of a digital convergence apparatus according to the present invention. In FIGS. 19 and 20, the same elements as those shown in FIGS. 1 and 2 are assigned the same reference numerals, and description of redundant aspects is omitted.

In FIG. 19, data transfer controller 43 controls selector 45 to provide a write address or a read address to field memory 144, the write address being provided from data transfer controller 43 and the read address being provided from read address generator 46. Thus, selector 45 gives the received address to field memory 144 for scanning. Correction data or differential data read out of the field memory 144 is supplied to horizontal interpolator 171. Like vertical interpolator 71, horizontal interpolator 171 which interpolates data between the data points supplied from field memory, but in the horizontal direction. The output of horizontal interpolator 171 is converted into an analog signal by D/A converter 151, filtered by low pass filter 152, and amplified by amplifier 153. The resultant signal is then used by convergence correction coil 132 to correct convergence in the horizontal direction. FIG. 20 shows horizontal interpolator 171 which includes a horizontal adder 172 and a horizontal static convergence correction data memory 173, like vertical interpolator 71.

As described above, the present invention can provide an extremely preferable digital convergence apparatus which improves the quality of screen by preventing the density of the scanning lines from lacking uniformity even when the convergence is corrected.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A digital convergence apparatus, comprising:

a first memory storing convergence correction data for plural correction executing points aligned in a horizontal or vertical direction on a screen;

a first static convergence compensation data memory storing a first static convergence compensation data for correcting the entire screen in the same direction;

a second static convergence compensation data memory for storing a second static convergence compensation data which is different from the first static convergence compensation data by an amount based on a distance between scanning lines;

selecting means for producing a selected output by selecting an output from the first or the second static convergence compensation data memory in response to an odd field period or an even field period;

adding means for generating an added output by adding output from the first memory and the selected output;

vertical interpolation means for generating interpolated output by interpolating the added output in the vertical direction; and a convergence correction coil correcting convergence based on the interpolated output.

2. A digital convergence apparatus as claimed in claim 1, wherein the convergence correction data stored in the first memory, the first static convergence compensation data and the second static convergence compensation data include data assigned for correcting the convergence in the horizontal and vertical directions of the screen, and the convergence correction coil includes coils that are used to perform convergence corrections in the horizontal and vertical directions of the screen, respectively.

3. A digital convergence apparatus of claim 1, wherein the convergence correction data stored in the first memory comprises convergence compensation data assigned to the correction executing points on a prescribed horizontal scanning line and differential data between the convergence compensation data of the correction executing points which are mutually adjacent in the vertical direction.

4. A digital convergence apparatus comprising:

a horizontal convergence compensation data memory storing horizontal convergence compensation data for a plurality of correction executing points, the horizontal convergence compensation data for correcting convergence in the horizontal direction on a screen;

a vertical convergence compensation data memory storing vertical convergence compensation data for the plurality of correction executing points, the vertical convergence compensation data for correcting convergence in the vertical direction on the screen;

a horizontal static convergence data memory storing a horizontal static convergence compensation data for correcting convergence in the horizontal direction on the entire screen;

a first static convergence compensation data memory storing a first static convergence compensation data for correcting convergence on the entire screen in the vertical direction;

a second static convergence compensation data memory storing a second static convergence compensation data that is different from the first static convergence compensation data by an amount based on a distance between scanning lines;

address control means for controlling readout from the horizontal and vertical convergence compensation data memories;

selecting means for producing a selected output by selecting an output from the first or the second static convergence compensation data memory in response to an odd field period or an even field period;

horizontal adding means for generating a horizontal added output by adding the convergence compensation data stored in the horizontal convergence compensation data memory with the horizontal static convergence compensation data;

vertical adding means for generating a vertical added output by adding the vertical convergence compensation data stored in the vertical convergence compensation data memory with output from the selecting means;

horizontal interpolation means for generating horizontal interpolated output by calculating a convergence compensation data at a prescribed position between horizontally adjacent correction executing points based on the horizontal added output;

vertical interpolation means for generating vertical interpolated output by calculating a convergence compensation data at a prescribed position between vertically adjacent correction executing points based on the vertical added output;

a horizontal convergence correction coil to which the horizontal interpolated output is supplied; and a vertical convergence correction coil to which the vertical interpolated output is supplied.

5. A digital convergence apparatus, comprising:

a first memory storing convergence correction data for a plurality of correction executing points aligned in horizontal or vertical direction on a screen;

a static convergence data memory storing a static convergence correction data for correcting the entire screen in the same direction;

an offset data memory storing a first offset data for an odd field and a second offset data for an even field, the first and second offset data being used to offset the static convergence correction data, second offset data being based on a distance between scanning lines;

selecting means for producing selected output by selectively reading the first or the second offset data stored in the offset data memory according to the odd field period or the even field period;

adding means for generating added output by correcting the static convergence correction data stored in the static convergence data memory based on the selected output and adding the corrected static convergence correction data to the convergence correction data stored in the first memory;

vertical interpolating means for generating vertical interpolated output by interpolating the added output in the vertical direction; and a convergence correction coil correcting convergence based on the vertical interpolated output.

6. A digital convergence apparatus as claimed in claim 5, wherein the static convergence correction data stored in the static convergence data memory corresponds with an upper bit of the convergence correction data stored in the first memory; and the first and second offset data stored in the offset data memory correspond with lower bits of the convergence correction data stored in the first memory.

7. A digital convergence apparatus as claimed in claim 5, wherein the offset memory also stores a third offset data and a fourth offset data, the third and fourth offset data being respectively associated with the even and odd fields and being used to offset the static convergence correction data, at least one of the third and fourth offset data being based on the distance between the scanning lines.

8. A digital convergence apparatus as claimed in claim 5, wherein the offset data memory stores a plurality of the first offset data for the odd field and a plurality of the second offset data for the even field, the first and second offset data being used to offset the static convergence correction data according to positions on the screen, at least one of the offset data being based on the distance between the scanning lines.

9. A digital convergence apparatus, comprising:

a first memory storing convergence correction data for plural correction executing points aligned in a horizontal or vertical direction on a screen;

a first static convergence compensation data memory storing a first static convergence compensation data for correcting the entire screen in the same direction;

a second static convergence compensation data memory storing a second static convergence compensation data which is different from the first static convergence compensation data by an amount based on a distance between scanning lines;

a selector circuit producing a selected output by selecting an output from the first or the second static convergence compensation data memory in response to an odd field period or an even field period;

an adder generating an added output by adding output from the first memory and the selected output;

a vertical interpolator generating vertical interpolated output by interpolating the added output in the vertical direction;

a convergence correction coil correcting convergence based on the vertical interpolated output.

10. A digital convergence apparatus as claimed in claim 9, wherein the convergence correction data stored in the first memory, the first static convergence compensation data and the second static convergence compensation data include data assigned for correcting the convergence in the horizontal and vertical directions of the screen, and the convergence correction coil includes coils that are used to perform convergence corrections in the horizontal and vertical directions of the screen, respectively.

11. A digital convergence apparatus of claim 9, wherein the convergence correction data stored in the first memory comprises convergence compensation data assigned to the correction executing points on a prescribed horizontal scanning line and differential data between the convergence compensation data of the correction executing points which are mutually adjacent in the vertical direction.

12. A digital convergence apparatus comprising:
- a horizontal convergence compensation data memory storing horizontal convergence compensation data for a plurality of correction executing points, the horizontal convergence compensation data for correcting convergence in the horizontal direction on a screen;
- a vertical convergence compensation data memory storing vertical convergence compensation data for the plurality of correction executing points, the vertical convergence compensation data for correcting convergence in the vertical direction on the screen;
- a horizontal static convergence compensation data memory storing a horizontal static convergence compensation data for correcting convergence in the horizontal direction on the entire screen;
- a first static convergence compensation data memory storing a first static convergence compensation data for correcting convergence on the entire screen in the vertical direction;
- a second static convergence compensation data memory storing a second static convergence compensation data that is different from the first static convergence compensation data by an amount based on a distance between scanning lines;
- an address controller controlling readout from the horizontal and vertical convergence compensation data memories;
- a selector circuit producing a selected output by selecting an output from the first or the second static convergence compensation data memory in response to an odd field period or an even field period;
- horizontal adder generating a horizontal output by adding the horizontal convergence compensation data stored in the horizontal convergence compensation data memory with the horizontal static convergence compensation data;
- vertical adder generating a vertical output by adding the vertical convergence compensation data stored in the vertical convergence compensation data memory with the selected output from the selector circuit;
- horizontal interpolator generating a horizontal interpolated output by calculating a convergence compensation data at a prescribed position between horizontally adjacent correction executing points based on the horizontal added output;
- vertical interpolator generating a vertical interpolated output by calculating a convergence compensation data at a prescribed position between vertically adjacent correction executing points based on the vertical added output;
- a horizontal convergence correction coil to which the horizontal interpolated output is supplied; and
- a vertical convergence correction coil to which the vertical interpolated output is supplied.

13. A digital convergence apparatus, comprising:
- a first memory storing convergence correction data for a plurality of correction executing points aligned in a horizontal or vertical direction on a screen;
- a static convergence data memory storing a static convergence correction data for correcting the entire screen in the same direction;
- an offset data memory storing a first offset data for an odd field and a second offset data for an even field, the first and second offset data being used to offset the static convergence correction data, second offset data being based on a distance between scanning lines;
- a selector producing selected output by selectively reading the first or the second offset data stored in the offset data memory according to the odd field period or the even field period;
- an adder generating added output by correcting the static convergence correction data stored in the static convergence data memory based on the selected output and adding the corrected static convergence correction data to the convergence correction data stored in the first memory;
- vertical interpolator generating vertical interpolated output by interpolating the added output in the vertical direction;
- a convergence correction coil correcting convergence based on the vertical interpolated output.

14. A digital convergence apparatus as claimed in claim 13, wherein the static convergence correction data stored in the static convergence data memory corresponds with an upper bit of the convergence correction data stored in the first memory; and
the first and second offset data stored in the offset data memory correspond with lower bits of the convergence correction data stored in the first memory.

15. A digital convergence apparatus as claimed in claim 13, wherein the offset memory also stores a third offset data and a fourth offset data, the third and fourth offset data being respectively associated with the even and odd fields and being used to offset the static convergence correction data, at least one of the third and fourth offset data being based on the distance between the scanning lines.

16. A digital convergence apparatus as claimed in claim 13, wherein the offset data memory stores a plurality of the first offset data for the odd field and a plurality of the second offset data for the even field, the first and second offset data being used to offset the static convergence correction data according to positions on the screen at least one of the offset data being based on the distance between the scanning lines.

* * * * *